UNITED STATES PATENT OFFICE.

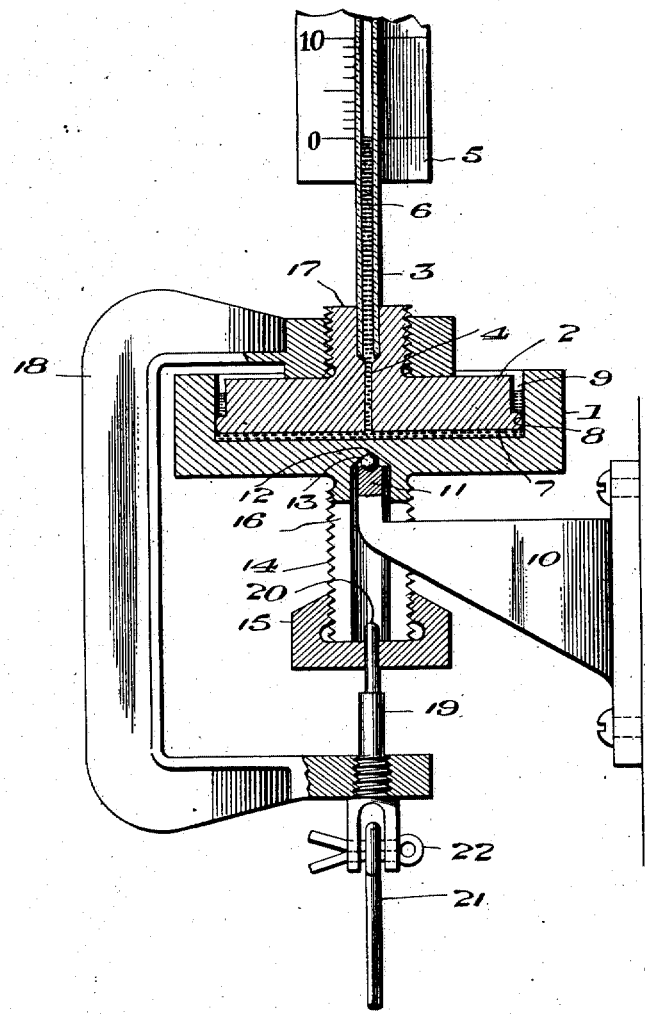

ARTHUR S. DYSART, OF THE UNITED STATES NAVY.

LIQUID SCALE.

1,279,304. Specification of Letters Patent. Patented Sept. 17, 1918.

Application filed June 25, 1917. Serial No. 176,789.

*To all whom it may concern:*

Be it known that I, ARTHUR S. DYSART, lieutenant, junior grade, in the United States Navy, a citizen of the United States, have invented certain new and useful Improvements in Liquid Scales, of which the following is a specification.

This invention relates to that class of scales which relies upon the height of a liquid column to indicate the weight being measured.

Scales of this character generally employ a plunger operating in a cylinder and resting upon a fluid. In this general type of scale there is liability of considerable friction between the plunger and the cylinder, due to the wide surface of the former and the liability of the parts to get out of alinement. Furthermore, scales of this character have heretofore been defective because their accuracy is dependent upon the amount of liquid employed.

My invention has for its object the elimination of the foregoing, and other, defects inhering in liquid scales and to provide an improved scale wherein the plunger has only a line contact with the cylinder, thereby preventing binding; further, to mount the liquid sight tube and scale directly on the moving element, the plunger, thus making the accuracy of the scale entirely independent of the amount of liquid employed. Preferably, mercury will be used as the liquid on which the plunger rests and which is forced up into the sight tube to indicate, in connection with the graduations on the scale carried by the plunger, the weight which is being measured by the device.

The cup or cylinder and the plunger are made of steel or some substance which will not be wet by mercury. By providing a radial clearance between the periphery of the plunger and the interior wall of the cup of, say, .0004, a pressure of about 30" of mercury will be held. I have determined by experiment that a clearance of this character will prevent the plunger from binding in the cup. The plunger may assume the form of a thin disk, or, it may be relatively thick and provided with a periphery which is rounded or approximately spherical. A spherical contact edge will prevent binding on the wall of the cup whether the plunger is, or is not, set squarely. A lubricant, for instance cylinder oil, is provided in the annular space around the plunger and above the line contact portion of the periphery thereof.

To prevent the possibility of friction between the plunger and the cup, an improved one-point support, for instance a ball, is provided so that the mechanism will be self-alining.

The embodiment of the invention hereinafter set forth is to be considered as illustrative, rather than restrictive, of the scope thereof, as modifications may be resorted to without departing from the essential principles of the invention.

The accompanying drawing is a vertical elevation with certain parts broken away, and others in section, showing one embodiment of the invention.

The cup or cylinder is shown at 1 and the plunger at 2. A glass sight tube 3 is set into the plunger and carried thereby, the interior thereof communicating with a port 4 leading to the lower face of the plunger. A suitably graduated scale 5 is carried by the tube 3, or otherwise mounted on the plunger 2, for the direct reading of the mercury column 6 thereon. The scale 5 will be graduated to show weights in pounds and ounces.

The mercury supports the plunger 2, as shown at 7, but does not rise past the line contact edge or periphery 8 of the plunger. I prefer to provide a spherical or rounded periphery 8, but I do not limit myself thereto, as any line edge or periphery will serve the purpose of preventing binding of the plunger 2 on the cup 1. In practice, I have found that if a clearance of .0004 is provided between the line contact edge 8 and the interior wall of the cup 1, a pressure of about 30" of mercury will be retained without passing upwardly beyond the edge 8. The plunger 2 is of smaller diameter above the line edge 8 and the space 9 is filled with a lubricant, for instance, cylinder oil, which lubricates the piston and prevents corrosion.

I prefer to make the plunger 2 and cup 1 of steel, because mercury will not wet such a material. I do not, however, limit myself to the use of steel, as any other material having the aforementioned property will serve the purpose.

The plunger 2 may be a thin disk instead of the relatively thick plunger shown. The purpose is to provide a line contact between the plunger and the cup to prevent binding and to minimize friction.

A bracket 10 secured to any suitable support is provided with an up-turned end 11 having a one-point support 12 for the cup 1. A needle point may be provided, but I have shown a single ball 13 seated in concavities in the portion 11 and the cup 1 for that purpose. This bearing causes the device to be self-alining and eliminates lateral pressure and accompanying friction.

The cup 1 extends downwardly in the form of a screw-threaded, tubular nipple 14 provided with a cap 15, and having a slot 16 which loosely receives the end of the bracket 10.

The upper face of the plunger 2 has a screw-threaded boss 17. A yoke 18 has an internally screw-threaded eye which receives the boss 17. Screwed into the lower part of the yoke 18 is a bolt 19 which has a guide pin 20 slidable in a hole in the cap 15. The object to be weighed is suspended by a rod 21 having a connection, such as a cotter pin 22, to the clevis on the lower end of the bolt 19.

The object to be weighed being suspended by the rod 21, the weight thereof is transmitted through the yoke 18 and plunger 2 to the mercury bed 7, placing the latter under compression and forcing it upwardly through the port or channel 4 and sight tube 3. The upper end of the mercury column 6, by its registration with the graduations on the scale 5, indicates the exact weight.

By mounting the sight tube 3 and scale 5 on the plunger 2 so that they are bodily carried thereby, makes the accuracy of the scale entirely independent of the amount of liquid employed, thus overcoming a serious defect heretofore incident to liquid scales.

By using a plunger which makes only a line contact with the cylinder or cup, binding of the plunger of the cylinder is rendered impossible and another element of inaccuracy in a liquid scale is thus obviated. In that connection, the employment of a liquid, such as mercury, which will not wet the steel of the cylinder, makes the plunger tight against considerable pressures.

It is within the spirit of my invention to make either the plunger or the cup the movable element. The sight tube 3 and scale 5 are bodily carried by, and movable with, whichever of the two elements, the plunger or cylinder, constitutes the movable element of the device.

Having thus described my invention, what I claim as new and desire to secure by Letters Patent, is:—

1. A liquid scale comprising a cup or cylinder and a plunger, one of which is the movable element of the scale and subject to the weight being measured, a free liquid interposed between the cylinder and plunger, and a transparent sight tube and graduated scale bodily carried by, and movable with, the movable element aforesaid, the scale being arranged for direct reading thereon from the liquid in the sight tube.

2. A liquid scale comprising a cup or cylinder, a liquid contained therein, a plunger operable within the cup and resting upon the liquid, a transparent sight tube bodily carried by, and movable with the plunger and in communication with the liquid aforesaid, whereby the liquid is free to be forced up into said tube, and a scale carried by the plunger and movable therewith, arranged for direct reading thereon from the liquid in the sight tube.

3. A liquid scale comprising a cup or cylinder, and a plunger operable therein which has a line contact therewith, one of said parts constituting the movable element of the scale, a free liquid interposed between the plunger and the cup or cylinder, the movable element by the pressure exerted on the liquid being adapted to cause the latter to indicate the weight acting on said movable element.

4. A liquid scale comprising a cup or cylinder, and a plunger operable therein which has a line contact therewith, one of said parts constituting the movable element of the scale, a visible liquid interposed between the plunger and the cup or cylinder, a transparent sight tube carried by and movable with the movable element and arranged to receive the liquid, and a scale carried by the movable element, with which the liquid column forced into said sight tube is adapted to register to indicate by direct reading from the liquid column onto the scale the weight to which the movable element is subject.

5. A liquid scale comprising a cup or cylinder, and a plunger operable therein which has a line contact therewith, one of said parts constituting the movable element of the scale, a liquid interposed between the plunger and cup possessing a non-wetting property, and means for indicating the weight to which the movable element is subject by the pressure exerted by said movable element on the non-wetting liquid aforesaid.

6. A liquid scale comprising a cup or cylinder, and a plunger having a contact periphery of rounded or substantially spherical form so that it will fit the cup or cylinder without binding, thus constituting a line contact, one of said parts constituting the movable element of the scale, a free liquid interposed between the plunger and the cup or cylinder, and weight indicating means controlled by the pressure exerted on the liquid by the movable element aforesaid.

7. A liquid scale comprising a cup and plunger, the latter having a line contact with the cup, one of said parts constituting the movable element of the scale, a free liquid interposed between the cup and cylinder which is adapted to indicate the weight to which the movable element is subject, and means for lubricating the plunger to prevent corrosion of the plunger and cup.

8. A liquid scale comprising a cup and plunger, the latter having a line contact with the cup, one of said parts constituting the movable element of the scale, a free liquid interposed between the cup and cylinder which is adapted to indicate the weight to which the movable element is subject, and a lubricant contained within the cup above the liquid aforesaid, said lubricant being adapted to lubricate the plunger and prevent corrosion of the plunger and cup.

9. A liquid scale comprising a cup or cylinder and a plunger, one of which constitutes the movable element of the scale, a scale, a liquid interposed between the plunger and the cup which is adapted to indicate on the scale the weight to which the movable element is subject, and a guide arranged co-axially with the plunger and cup adapted to maintain them in relative position and straight-line operation.

10. A liquid scale comprising a cup and plunger which are relatively movable, one of which constitutes the weight-supporting element of the scale, a scale, a liquid interposed between the plunger and cup adapted to indicate on the scale the weight to which the movable element is subject, and a one-point support for the elements aforesaid, whereby they are adapted to automatically aline their axis of motion with that of the impressed force to thereby minimize lateral pressure on the relatively movable cup and plunger and the friction resulting therefrom.

In testimony whereof I hereunto affix my signature.

ARTHUR S. DYSART.

Copies of this patent may be obtained for five cents each, by addressing the "Commissioner of Patents, Washington, D. C."